March 22, 1960     A. T. JOHNSON     2,929,419
SAW GUARD
Filed Feb. 25, 1958
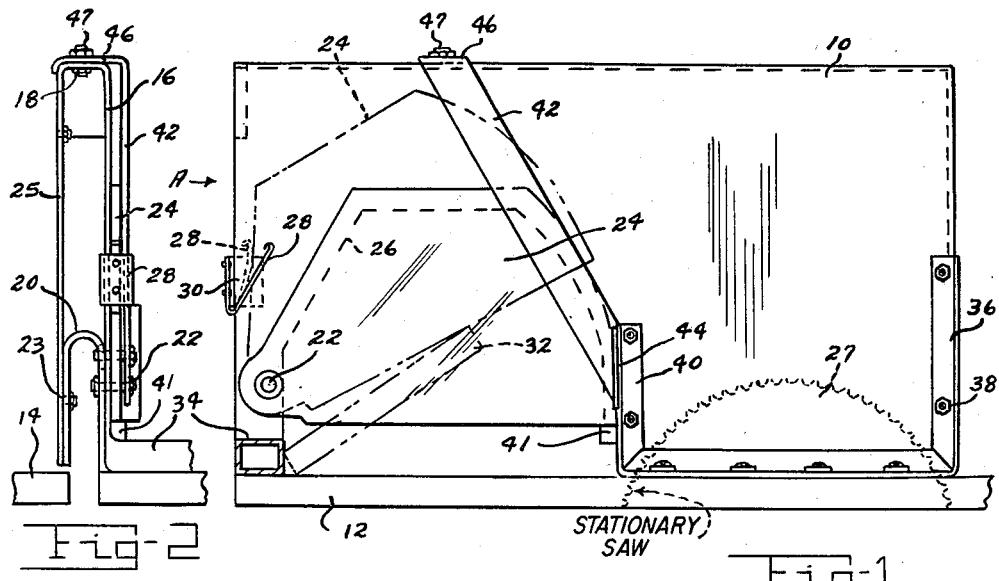
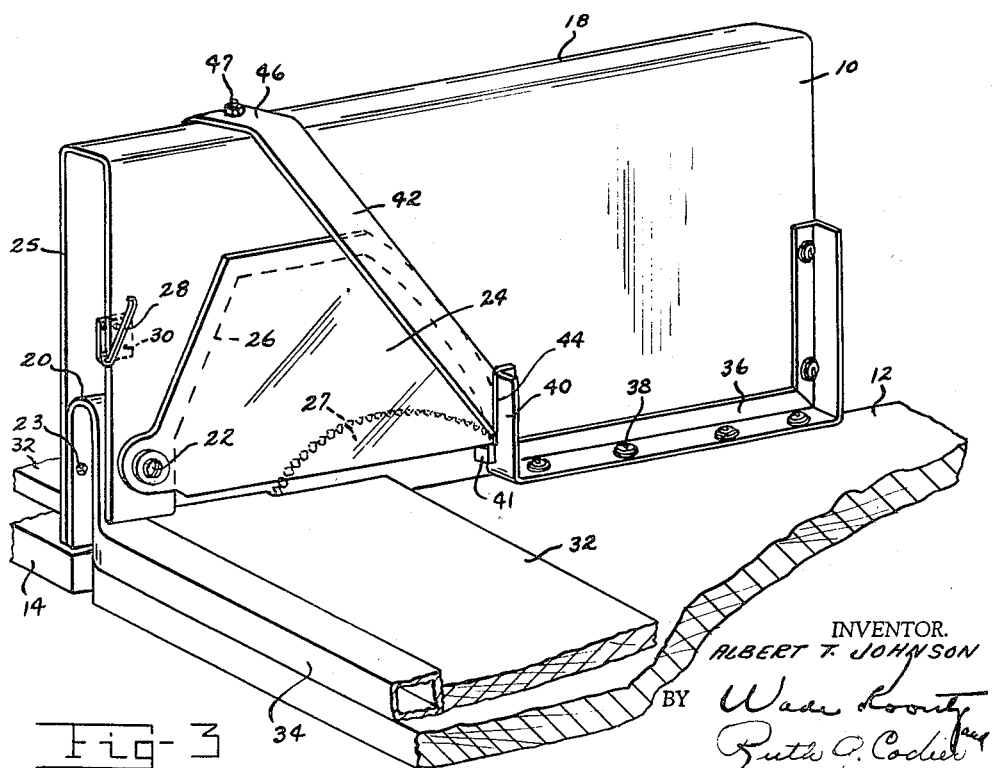
INVENTOR.
ALBERT T. JOHNSON
ATTORNEYS

2,929,419
SAW GUARD

Albert T. Johnson, Del Paso Heights, Calif.

Application February 25, 1958, Serial No. 717,536

2 Claims. (Cl. 143—159)

(Granted under Title 35, U.S. Code (1952), sec. 266)

The invention described herein may be manufactured and used by or for the United States Government for governmental purposes without payment to me of any royalty thereon.

This invention relates to a saw guard and, more particularly, to a guard for installation on a table where saw and table move relatively.

The object of the invention is the provision of a guard for a rotary saw placed and installed in such a way that the operator is protected at all times from injury due to contact with the rotating saw blade.

A further object of the invention is the provision of a guard plate mounted on the moving portions of a "California cutoff machine" where the rotary saw is mounted in a stationary manner on the table and a carrier portion of the table moves to and from the saw.

A further object of the invention is the provision of a saw guard which protects the operator from injury and at the same time allows full view of the saw while it is operating.

A further object of the invention is the provision of a saw guard pivotally movable with respect to the carrier on which it is mounted for facilitating placement and removal of the work piece.

A further object of the invention is the provision of a resilient stop for limiting the pivotal movement of the guard plate.

Further objects and advantages will become obvious as the description proceeds.

In the drawings:

Fig. 1 is a side elevational view of the guard showing the guard carrier and showing in phantom the saw guard pivoted upwardly for withdrawal or placement of the work.

Fig. 2 is an end elevation of the guard looking in the direction of the arrow A in Fig. 1.

Fig. 3 is a perspective view of the saw guard showing the saw in operating position, and portions of the carrier and work piece broken away.

The saw guard, which constitutes the invention, is adapted for use on any saw table where saw and work carrier move relatively. The table for which the invention was first adapted for use is the "California cutoff machine." In this type of table, the saw is stationary and the carrier for the work piece moves backward and forward, to and from the operator, into and out of contact with the saw.

In the drawing, the guard housing or frame 10 is mounted on the moving carrier 12, which is part of a stationary table, shown fragmentarily at 14. The housing or frame 10 is shown comprised of a hood shaped piece of sheet material having two side members 16 placed normally to the table 14, and provided with a horizontal roof portion 18. The bracket 20 is one of the conventional elements of this particular type of saw table and is an inverted U-shaped strap. The two side elements 16 of the hood 10 are secured to the arms of the strap 20 by means of bolts 22 and 23. The bolt 22 also serves as a pivot for a transparent guard plate 24. The housing 10 forms a covering frame extending over the saw 27.

The saw 27 is mounted on the stationary portion of the table 14, but this arrangement could conceivably be reversed with the work carrier being stationary and the saw movable. The work piece 32, held on the carrier 12 against the stop rail 34 is moved into the saw as shown in Fig. 3 by the movement of the work piece carrier. The elements 16 are provided with cut-out sections, one of which is shown at 26, and which serve as window openings through which the operation of the saw can be observed at all times. The plate 24 and the orifices 26 may be of any desired or expedient configuration. That shown in the drawing as the preferred embodiment is a plate and orifice of trapezoidal shape. This form conforms generally to straight lines, lends itself to expedience in manufacture and provides the greatest possible visibility. The working position of the operator is in front of the table 12, facing it and at the right of the hood member 10, the guard plate 24 pivoting upwardly towards him and his hands always manipulate the work piece on the right side of the guard plate 24.

In Fig. 1, the guard plate is shown in dotted lines, pivoted upwardly and in position to allow placement or removal of a piece of lumber or other work piece. A leaf spring 28 is attached by a bracket 30 to the element 16. The leaf spring 28 is so located as to provide a cushioned stop for the upward movement of the guard plate 24. This is shown best in dotted position of the plate 24 and spring 28 of Fig. 1.

The carrier 12, as above noted, is provided with an edge rail 34 which serves as a stop and guide for the work piece 32. The guard housing 10 is secured to the carrier or moving portion 12 of the table by any suitable means, such as the angle iron 36 and bolts 38. A segment 40 of the angle iron 36 is positioned normally to the carrier 12, is spaced from the hood 10 by a spacing block 41, and serves as an anchoring means for a guide bar or rib 42. The guide 42 is welded at 44, or otherwise secured to the segment 40, extends upwardly and obliquely towards the operator, in spaced relation to the hood 10, and provides a guide at all times for the guard plate 24. The guide bar 42 has a horizontally extending portion 46, which is secured to the roof element 18 by a bolt 47 or by any other expedient means. The block 41, in addition to the function of spacing the guide rib 42 from the hood 10, provides a stop upon which the guard plate 24 rests, holding the lower edge of the plate horizontal and in spaced relation to the surface of the carrier 12, so that a work piece may be moved beneath it.

It is to be understood that the position of the operator is in front of the table, facing it and to the right of the hood 10, and that the plate 24 pivots upwardly toward, and downwardly away from him. It will be noted also that while the carrier is being moved in a direction away from the operator, and the lumber 32 or other work piece is being engaged by the saw, the transparent guard plate is in a position between the saw and the operator. The operator can see the saw but is continually protected from accidental encounter with it. He can grasp the work piece, and with it, tilt the plate upwardly and move the work piece without retracting the carrier. This is not routine use of the guard plate, but one of which it is capable. It is this arrangement which makes it possible for the operator to keep his hands on the work piece and guide and control it in the manner in which he wishes and still be free from danger of accidentally getting his hands into the rapidly revolving saw.

In the most efficient operation of the saw guard, the operator is instructed to lift the guard only when the carrier table is in retracted position and out of operating contact with the saw.

While the invention is shown and described in connection with one form for illustrative, rather than restrictive purposes, it is obvious that changes and modifications may be made by those skilled in the art without departing from the scope and spirit of the invention as defined in the accompanying claims.

I claim:

1. In a saw guard, a guard housing comprising two side elements and a roof, said housing positioned on the movable portion of a saw table and adapted to cover a stationary saw in both cutting and inoperative relations of said saw and table a side element being provided with a substantially trapezoidal cutout window in its lower side at the cutting position, a transparent guard plate pivoted to said hood in a position adjacent the lower edge of said hood normally covering said cutout window and located closely adjacent the working position of the operator, a guide rib secured to said hood in spaced parallel relation thereto and extending obliquely therealong, said transparent saw guard capable of pivoting for positioning and removal of work pieces through said cutout window, said guide rib forming with said hood a guide slot for said saw guard plate, a spacing member for defining the space betwen said guide rib and said hood, said spacing member also forming a rest and positioner for said guard plate, in the normal window closing position of said guard plate, a spring stop on said housing for cushioning and limiting the upward movement of said guard plate.

2. A saw guard comprising a housing mounted on a table in parallel juxtaposition to a rotary saw, and movable relatively thereto, said housing provided with a window opening adjacent the lower edge thereof, a transparent guard plate attached to said housing and movable to cover said window opening in both cutting and inoperative relations of said table, said guard plate movable also to partially uncover said window opening when contacted and moved by a work piece, a guide rib attached to said housing in parallel relation thereto and spaced therefrom, some portion of said guard plate being positioned, at all times between said housing and said guide rib, a stop for limiting the downward movement of said guard plate and insure parallel relationship between the lower edge of said guard plate and the working surface of said table, and a cushioned stop for limiting the upward movement of said guard.

References Cited in the file of this patent

UNITED STATES PATENTS

| | | |
|---|---|---|
| 997,720 | Troupenat | July 11, 1911 |
| 1,397,606 | Smith | Nov. 22, 1921 |
| 1,570,628 | Flohr | Jan. 26, 1926 |
| 1,998,245 | Laukhuff | Apr. 16, 1935 |
| 2,163,320 | Hammond | June 20, 1939 |

FOREIGN PATENTS

| | | |
|---|---|---|
| 54,389 | Denmark | Feb. 28, 1938 |